(12) United States Patent
Ji et al.

(10) Patent No.: US 12,386,773 B2
(45) Date of Patent: Aug. 12, 2025

(54) PERIPHERAL COMPONENT INTERCONNECT EXPRESS DEVICE RESET FOR AUTONOMOUS DRIVING SYSTEMS

(71) Applicants: Apollo Autonomous Driving USA LLC., Sunnyvale, CA (US); Beijing Baidu Netcom Science Technology Co., Ltd., Beijing (CN)

(72) Inventors: Yun Ji, Sunnyvale, CA (US); Congshi Huang, Sunnyvale, CA (US); Zhenwei Yu, Sunnyvale, CA (US); Dongpo Zou, Beijing (CN); Zhiyuan Li, Beijing (CN)

(73) Assignees: APOLLO AUTONOMOUS DRIVING USA LLC, Sunnyvale, CA (US); BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/248,678

(22) PCT Filed: Jan. 20, 2023

(86) PCT No.: PCT/CN2023/073342
§ 371 (c)(1),
(2) Date: Apr. 11, 2023

(87) PCT Pub. No.: WO2024/152345
PCT Pub. Date: Jul. 25, 2024

(65) Prior Publication Data
US 2025/0086134 A1    Mar. 13, 2025

(51) Int. Cl.
G06F 13/42    (2006.01)
G06F 9/445    (2018.01)

(52) U.S. Cl.
CPC ...... *G06F 13/4221* (2013.01); *G06F 9/44505* (2013.01); *G06F 2213/0026* (2013.01)

(58) Field of Classification Search
CPC ............ G06F 13/4221; G06F 9/44505; G06F 2213/0026
See application file for complete search history.

(56) References Cited

U.S. PATENT DOCUMENTS

| | | | |
|---|---|---|---|
| 2012/0079312 A1* | 3/2012 | Muthrasanallur ... | G06F 11/0793 714/E11.023 |
| 2014/0344632 A1* | 11/2014 | Ge ...................... | G06F 11/3041 714/49 |

(Continued)

*Primary Examiner* — Glenn A. Auve
(74) *Attorney, Agent, or Firm* — WOMBLE BOND DICKINSON (US) LLP

(57) ABSTRACT

In one embodiment, a method for controlling PCIe devices on an autonomous driving system (ADS) of an autonomous driving vehicle (ADV) is disclosed. The method includes scanning PCIe ports of the ADS to discover PCIe device(s) mounted on the ADS. Next, a comparison is performed between a list of the discovered PCIe device(s) and an expected list of PCIe devices for the ADS. Next, an offline PCIe device is determined based on the comparison, the offline PCIe device corresponding to a PCIe device that is present in the expected list of PCIe devices but not in the list of the discovered PCIe devices. Then a device reset command is transmitted to a programmable logic device that manages power for PCIe devices of the ADS to reset the offline PCIe device, wherein the programmable logic device generates a reset control signal for the offline PCIe device to reset the PCIe device.

20 Claims, 10 Drawing Sheets

(56) References Cited

U.S. PATENT DOCUMENTS

| | | | | |
|---|---|---|---|---|
| 2016/0210254 A1* | 7/2016 | Achlaug | ............. | G06F 13/4291 |
| 2017/0337069 A1* | 11/2017 | Huang | ................ | G06F 13/4282 |
| 2018/0074981 A1* | 3/2018 | Remis | ................ | G06F 13/4022 |
| 2018/0246840 A1* | 8/2018 | Bhutta | ................ | G06F 13/4282 |
| 2018/0373669 A1* | 12/2018 | Nash | ................... | G06F 13/4022 |
| 2020/0310933 A1* | 10/2020 | Zhu | ..................... | G06F 11/0784 |

* cited by examiner

PERIPHERAL COMPONENT INTERCONNECT EXPRESS DEVICE RESET FOR AUTONOMOUS DRIVING SYSTEMS

CROSS-REFERENCE TO RELATED APPLICATION

This application is a National Stage of International Application No. PCT/CN2023/073342, filed Jan. 20, 2023, which is hereby incorporated by reference in its entirety.

TECHNICAL FIELD

Embodiments of the present disclosure relate generally to operating autonomous driving vehicles. More particularly, embodiments of the disclosure relate to resetting peripheral component interconnect express (PCIe) devices on autonomous driving systems.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. The same motion planning and control is applied to all types of vehicles, which may not be accurate and smooth under some circumstances.

In order to accomplish autonomous driving, autonomous vehicles require vast amounts of precise and complex computing such as that used in machine learning techniques. These complex techniques require the use of peripheral equipment (such as PCIe devices), including processors such as graphics processing units (GPU), solid state drives (SSD), network interfaces cards (NIC), video capture cards, serial advanced technology attachment cards (SATA), or non-volatile memory express (NVMe) cards. These PCIe devices are mounted to the autonomous driving system (ADS) of the autonomous driving vehicle (ADV). Occasionally, a PCIe device may not be detected by a processor (e.g., central processing unit [CPU]) of the ADS and this can cause a safety issue in an ADV if the PCIe device is not reset.

Currently, PCIe devices are reset through a reboot of the ADS (which includes the entire autonomous driving system including the CPU and the PCIe devices mounted thereon) via a human safety driver. This process takes a significant amount of time (e.g., two minutes) and can cause significant safety issues.

Therefore, there is a need for an improved PCIe reset process for ADS in an ADV that reduces the amount of time it takes to reset offline PCIe devices, bring them back online, and minimize related safety issues.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
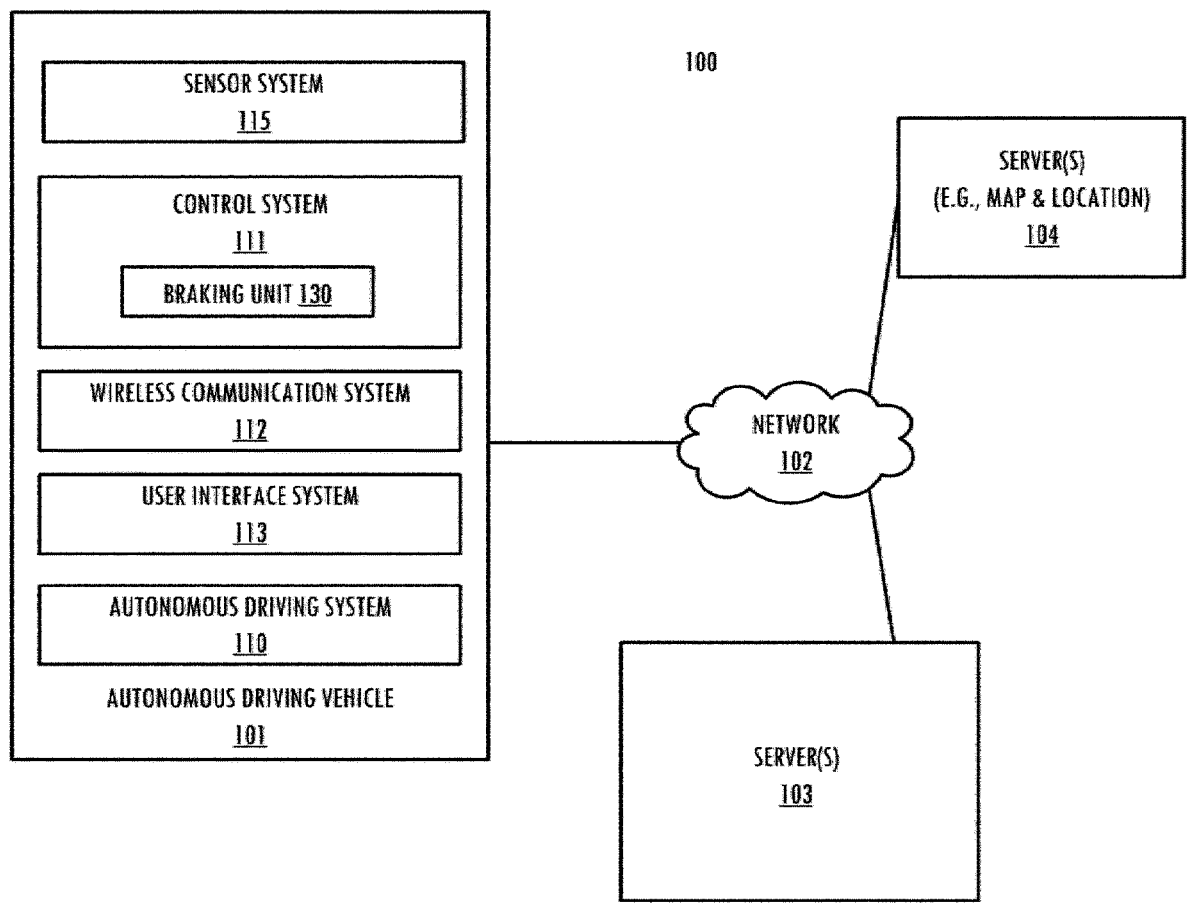
FIG. 1 is a block diagram illustrating a networked system, according to one embodiment.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a computer-implemented method for controlling peripheral component interconnect express (PCIe) devices on an autonomous driving system (ADS) of an autonomous driving vehicle (ADV) is disclosed, the method comprising: scanning one or more PCIe ports of the ADS to discover one or more PCIe devices mounted on the ADS; performing a comparison between a list of the discovered one or more PCIe devices and an expected list of PCIe devices for the ADS; determining an offline PCIe device based on the comparison, the offline PCIe device corresponding to a PCIe device that is present in the expected list of PCIe devices but not in the list of discovered PCIe devices; and transmitting a device reset command to a programmable logic device that manages power for PCIe devices of the ADS to reset the offline PCIe device, wherein the programmable logic device is caused to generate a reset control signal for the offline PCIe device to reset the offline PCIe device.

According to some other embodiments, a non-transitory machine-readable medium for controlling PCIe devices on an ADS of an ADV is disclosed, the machine-readable medium having instructions stored therein, which when executed by a processor, cause the processor to perform operations, the operations comprising: scanning one or more PCIe ports of the ADS to discover one or more PCIe devices mounted on the ADS; performing a comparison between a list of the discovered one or more PCIe devices and an expected list of PCIe devices for the ADS; determining an offline PCIe device based on the comparison, the offline PCIe device corresponding to a PCIe device that is present in the expected list of PCIe devices but not in the list of discovered PCIe devices; and transmitting a device reset command to a programmable logic device that manages power for PCIe devices of the ADS to reset the offline PCIe device, wherein the programmable logic device is caused to generate a reset control signal for the offline PCIe device to reset the offline PCIe device.

According to still other embodiments, a system for controlling PCIe devices on an ADS of an ADV is disclosed, the system comprising: one or more processors; and a memory coupled to the one or more processors to store instructions, which when executed by the one or more processors, cause the one or more processors to: scan one or more PCIe ports of the ADS to discover one or more PCIe devices mounted on the ADS; perform a comparison between a list of the discovered one or more PCIe devices and an expected list of PCIe devices for the ADS; determine an offline PCIe device based on the comparison, the offline PCIe device corresponding to a PCIe device that is present in the expected list of PCIe devices but not in the list of discovered PCIe devices; and transmit a device reset command to a programmable logic device that manages power for PCIe devices of the ADS to reset the offline PCIe device, wherein the programmable logic device is caused to generate a reset control signal for the offline PCIe device to reset the offline PCIe device.

As described herein, the improved approach to PCIe device reset substantially reduces the time it takes to bring PCIe devices back online and allow the ADS to resume operations that include utilizing the PCIe devices mounted thereon. This disclosure will now turn to descriptions of the figures.

FIG. 1 is a block diagram illustrating an autonomous driving network configuration according to one embodiment of the disclosure. Referring to FIG. 1, network configuration 100 includes ADV 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc. Servers 103-104 may also have the ability to remotely reset one or more devices on the ADS, such as one or more processors or one or more PCIe devices thereon.

An ADV refers to a vehicle that can be configured to operate in an autonomous mode in which the vehicle navigates through an environment with little or no input from a human driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, ADS 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
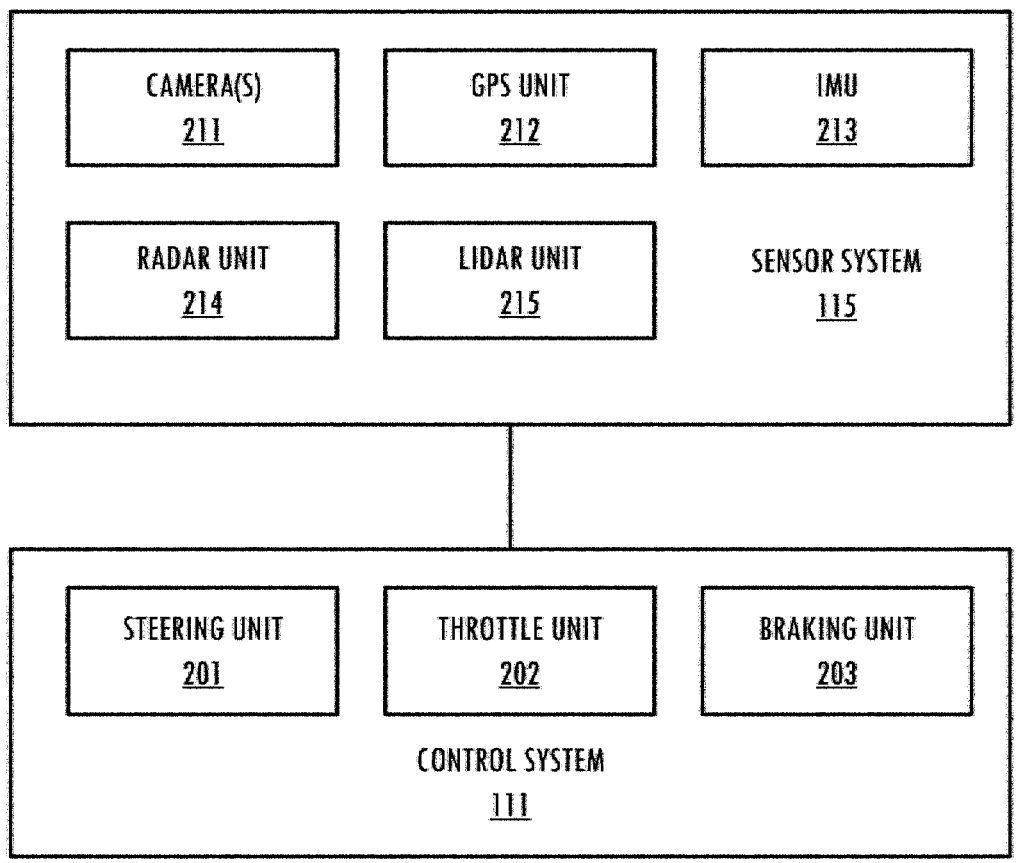
FIG. 2 is a block diagram illustrating an example of an ADV, according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker, electronic components on the ADS such as a PCIe device or processor within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3A:
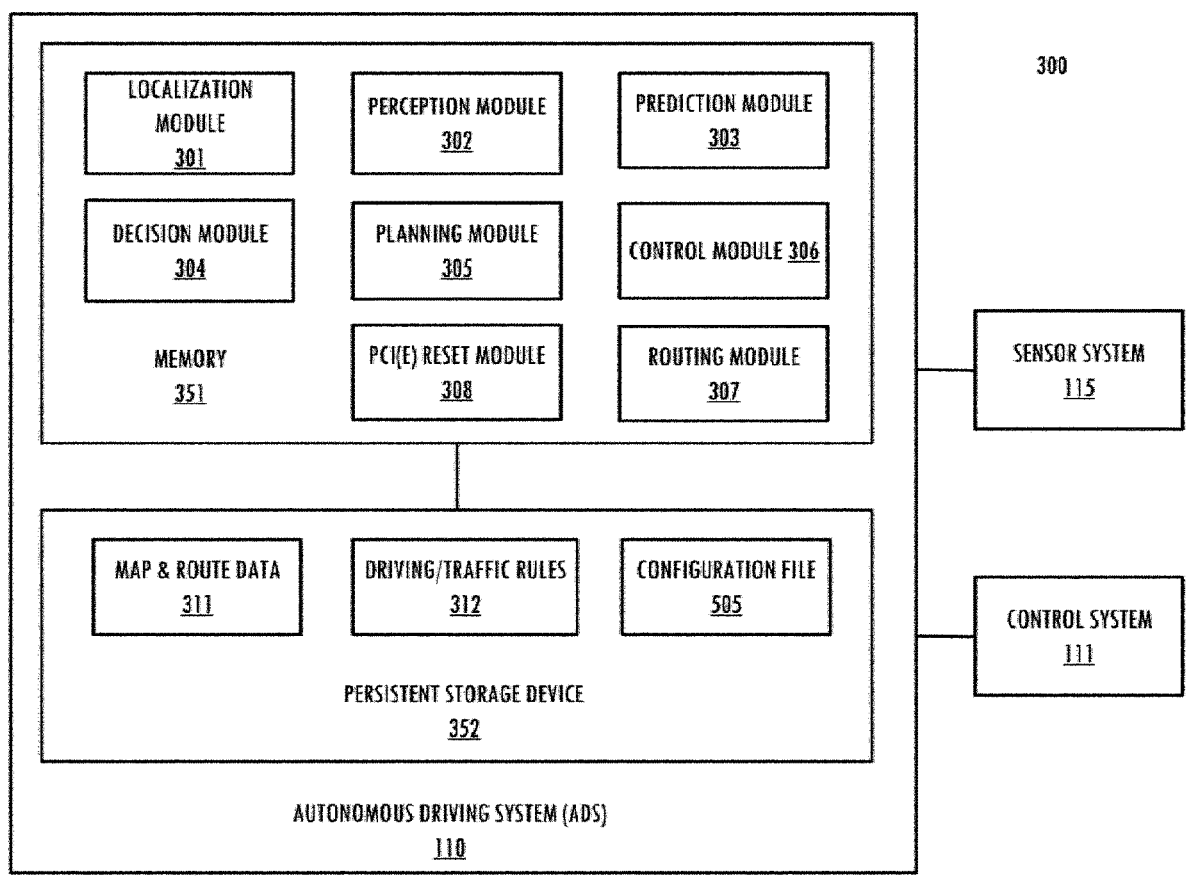
FIGS. 3A-3B are block diagrams illustrating an example of an ADS used with an ADV, according to one embodiment.
Figure 3B:
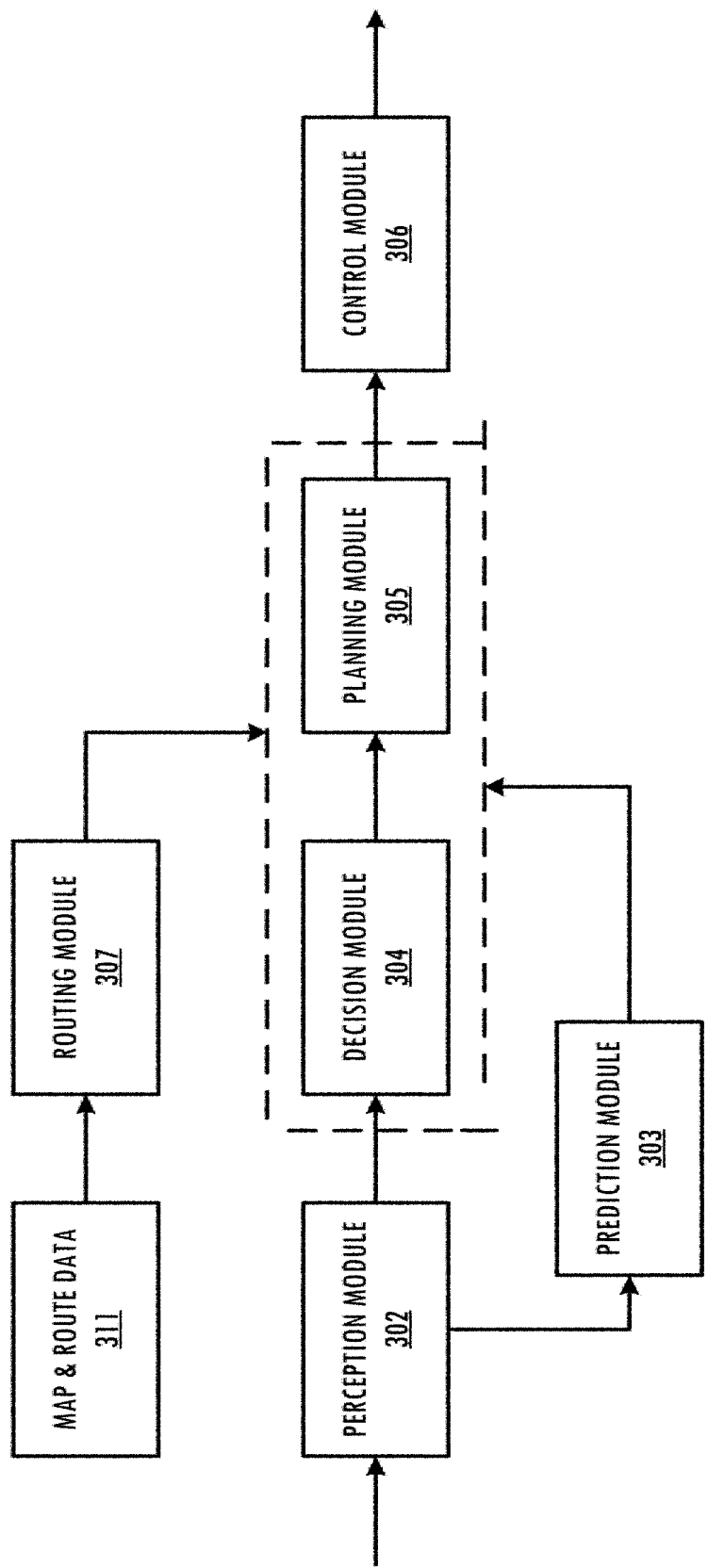

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and PCIe Reset Module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

In one embodiment, the PCIe reset module 308 is configured to reset PCIe devices mounted on the ADS compute board that are non-responsive or offline. FIGS. 4-7 provide further detail on the operation of the PCIe reset module 308.

Figure 4:
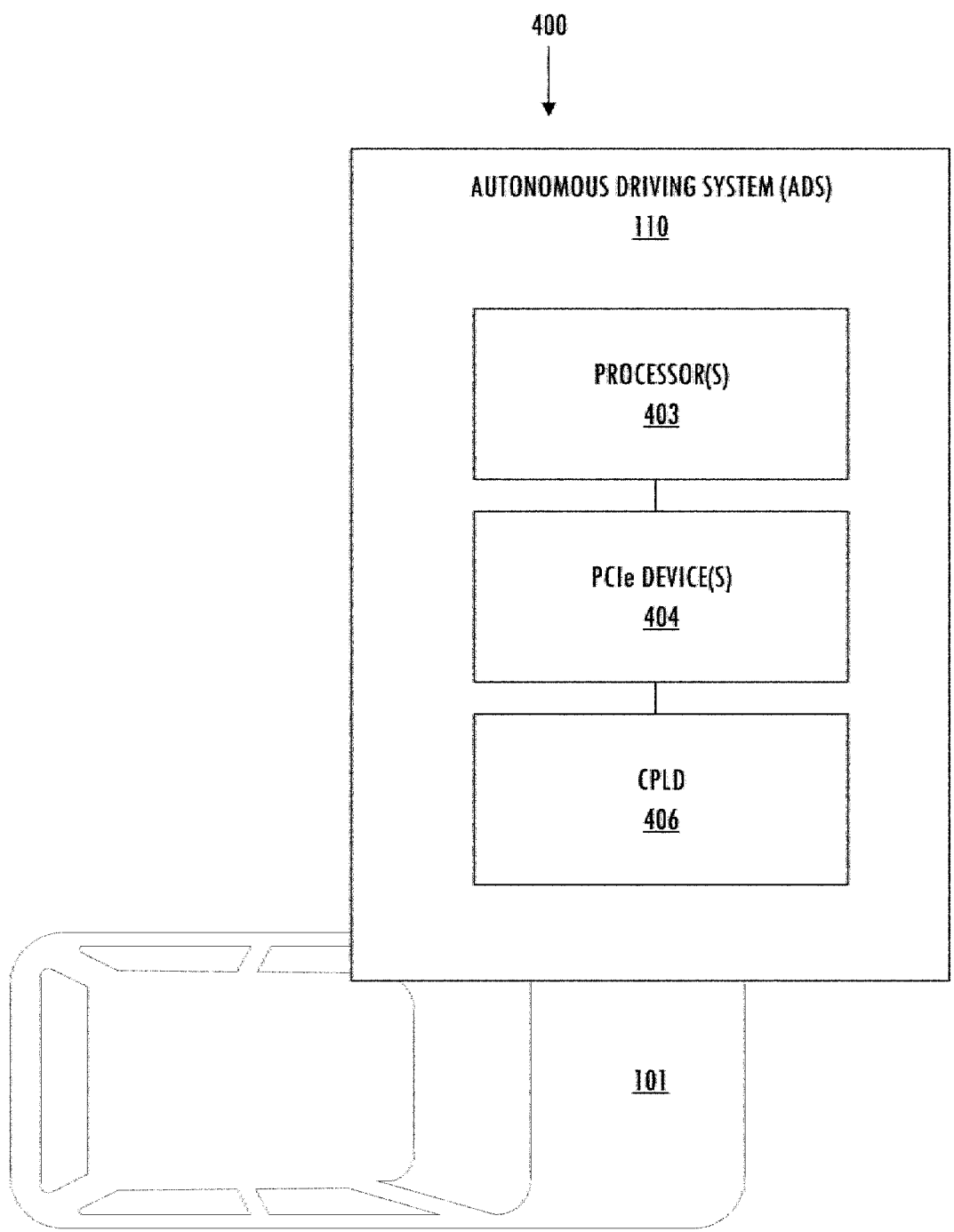
FIG. 4 is an illustration of an ADV with a block diagram illustrating various ADS components onboard, according to one embodiment.

FIG. 4 illustrates a top view of an example ADV 101 and a block diagram of some of the components that make up or interact with the PCIe reset module 308 above. For example, in some embodiments, the PCIe reset module 308 is software or an integrated circuit configured to perform the steps described herein. In some embodiments, the ADV 101 includes an ADS 110 having one or more processors 403 and one or more PCIe devices 404 mounted thereon. The ADS further includes a programmable logic device (e.g., complex programmable logic device (CPLD) 406) that manages power for the PCIe devices 404 of the ADS 110. As shown in FIG. 4, these components are in communication with one another and are a part of the ADV 101 and are used to (at least partially) control the ADV.

Figure 5A:
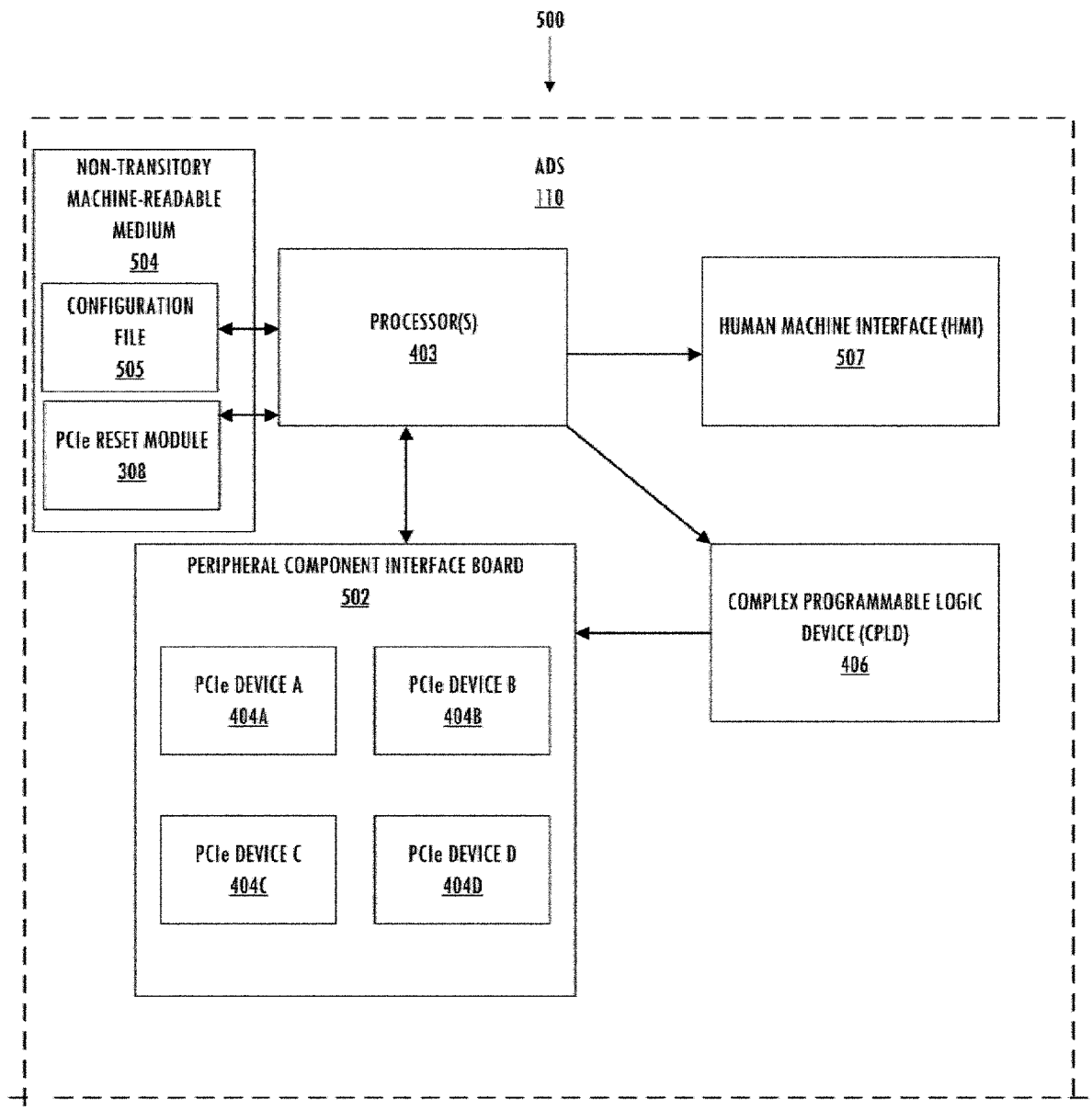
FIGS. 5A-5B are block diagrams of example systems for controlling PCIe devices on an ADS, according to one embodiment.

FIG. 5A illustrates a block diagram of a system 500 for controlling PCIe devices on an ADS of an ADV. In some implementations, the system 500 includes one or more processors 403 and a non-transitory machine-readable medium 504, such as a memory. In some implementations, the memory is coupled to the one or more processors 403 to store instructions (e.g., PCIe reset module 308), which when executed by the one or more processors 403, cause the one or more processors 403 to perform various functions. In some implementations, execution of the instructions cause the one or more processors 403 to scan one or more PCIe ports of the ADS 110 to discover one or more PCIe devices 404A-404D mounted on the ADS 110. For example, the ADS 110 may include a peripheral component interface board 502 that has mounted thereon one or more PCIe devices, such as, for example, PCIe device A 404A, PCIe device B 404B, PCIe device C 404C, and PCIe device D 404D. Execution of the instructions cause the one or more processors 403 to scan the PCIe ports on the peripheral component interface board 502 to identify the PCIe devices.

In some embodiments, the one or more PCIe devices includes one or more of: a graphics processing unit (GPU), a solid state drive (SSD), a network interface card (NIC), a video capture card, a serial advanced technology attachment (SATA) card, a non-volatile memory express (NVMe) card, or any other suitable PCIe device.

Figure 5B:
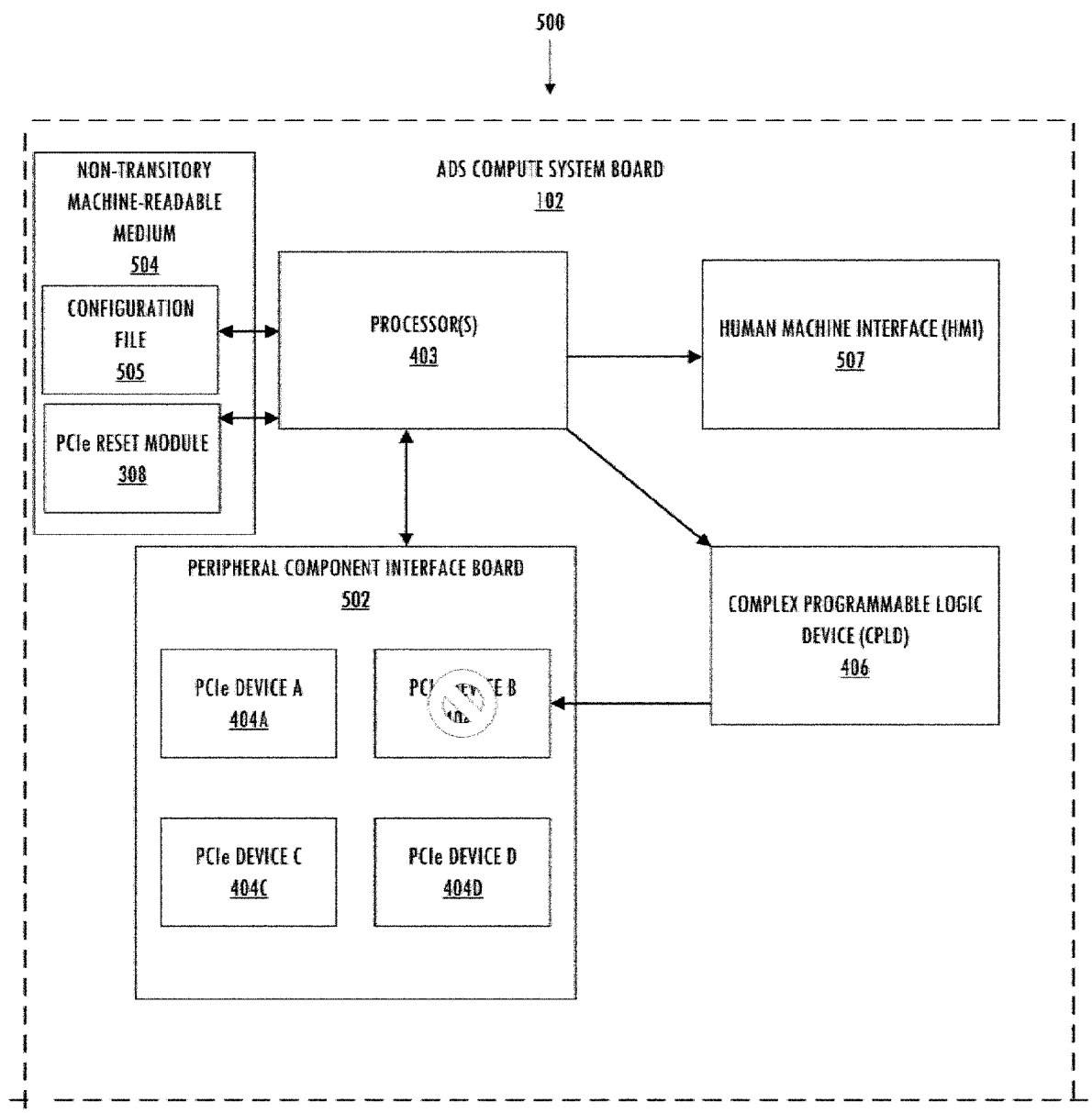

In some implementations, execution of the instructions causes the one or more processors 403 to create a list of discovered one or more PCIe devices discovered while scanning the PCIe ports. The list of discovered one or more PCIe devices may include all of the PCIe devices mounted on the peripheral component interface board 502 or the list could include less, based on whether any of the PCIe devices 404 are offline. For example, as shown in FIG. 5B, PCIe device B 404B is indicated as being offline. As such, the list of discovered one or more PCIe devices would include PCIe device A 404A, PCIe device C 404C, and PCIe device D 404D, but PCIe device B 404B would not be included on the list. Furthermore, the one or more processors 403 are caused, by execution of the instructions, to perform a comparison between the list of the discovered one or more PCIe devices and an expected list of PCIe devices for the ADS. In some implementations, the expected list of PCIe devices can be stored in a configuration file 505 stored in persistent storage, such as persistent storage device 352 of FIG. 3A, and loaded to the non-transitory machine-readable medium 504 of the ADS 110 for access by the one or more processors 403.

In some implementations, the one or more processors 403 are caused to determine an offline PCIe device (e.g., PCIe device B 404B in the example above and shown in FIG. 5B) based on the comparison, the offline PCIe device corresponding to a PCIe device that is present in the expected list of PCIe devices but not in the list of discovered PCIe devices. The ADS 110 includes a programmable logic device, such as CPLD 406. The CPLD is used to control or manage power and other features of the PCIe devices 404 on the ADS. In order to reset the offline PCIe device, the one or more processors 403 are caused to transmit a device reset command to the programmable logic device (e.g., CPLD 406) to reset the offline PCIe device. After receiving the device reset command from the one or more processors, the programmable logic device is caused to generate a reset control signal for the offline PCIe device to reset the offline PCIe device.

Figure 6A:
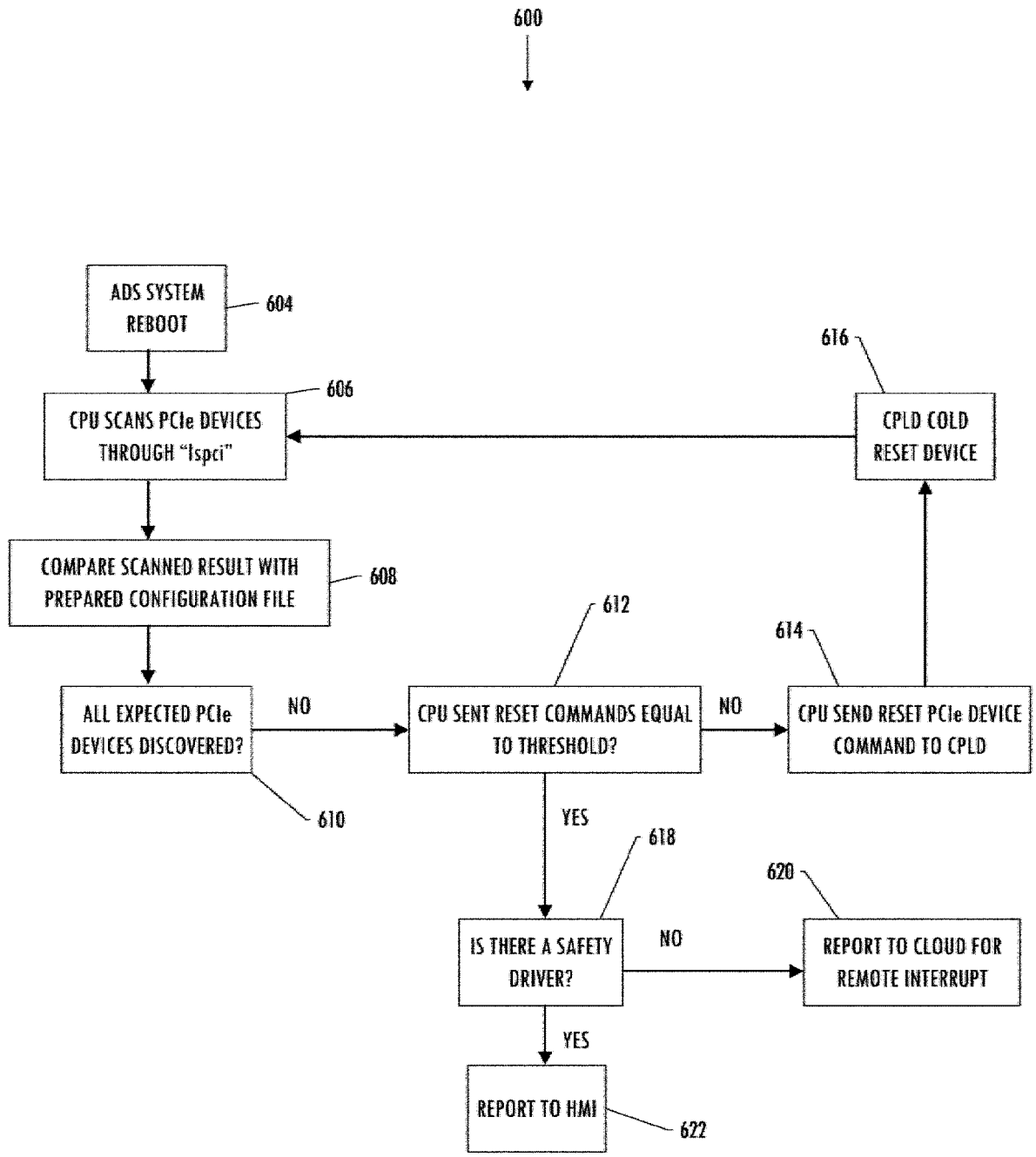
FIG. 6A is an example flow diagram for controlling PCIe devices on an ADS, according to one embodiment.

Referring to FIG. 5B, and using the example above where PCIe device B 404B is offline and not listed in the list of discovered one or more PCIe devices, the one or more processors 403 is caused to transmit a device reset command to the CPLD 406 to reset the PCIe device B 404B. In some cases, the offline PCIe device will not immediately restart and may need additional restart attempts. FIG. 6A below describes the process of additional restart attempts. In some embodiments, the ADS includes a human machine interface (HMI) 507 that allows an operator of the ADV to interact with the ADV and its component features, including the ADS. In some embodiments, as described further below, the offline PCIe device will not reset in response to the CPLD reset control signal, and a message will be displayed to the operator via the HMI 507. The operator may then manually reset the PCIe device via the HMI.

FIG. 6A is a flow chart 600 of an example process for restarting an offline PCIe device, such as offline PCIe device B 404B shown in FIG. 5B above. In some embodiments, the ADV is powered on and the ADS performs a system reboot 604. Following reboot, the one or more processors 403 (e.g., CPU) scans 606 the PCIe ports for PCIe devices through, for example, the lspci Unix command. lspci is a command on Unix-like operating systems that outputs detailed information about all PCI buses and devices in the system. In some embodiments, other PCI devices scanning and detection methodologies are used for other operating systems (OSs), such as, PCI scanning utility for windows OS. In some embodiments, one or more processors 403 (e.g., CPU) scans 606 the PCIe ports for PCIe devices periodically or in response to failure/unexpected events, e.g., PCIe reset failures or when processors 403 fail to communicate some PCIe devices. Similar to the procedure described above with respect to FIGS. 5A and 5B, the CPU then compares 608 the scanned result with a list of expected PCIe devices on a prepared configuration file stored in memory. The CPU then determines whether all expected PCIe devices were discovered by comparing the discovered PCIe devices list to the prepared configuration file 610.

However, if at least one of the expected PCIe devices is not on the discovered list of PCIe devices, the CPU first determines how many reset commands it has sent 612 already for the offline PCIe device in a given period of time, and determines whether the number of reset commands already sent in the given period of time is less than or equal to a predefined threshold. The predefined threshold can be any suitable threshold based on the acceptable number of reset attempts for a given PCIe device. If the number of reset commands sent by the CPU is less than the predefined threshold, then the CPU will send a device reset command 614 to the CPLD device. The CPLD device receives the device reset command from the CPU and thereafter transmits 616 a reset control signal for the offline PCIe device to reset. The process the CPU follows if the number of reset commands sent by the CPU is equal to the predefined threshold is described further below.

In some embodiments, after the CPLD has sent the reset control signal to the offline PCIe device to reset, the CPU is caused to scan 606 to discover the one or more PCIe devices again. The CPU is further caused to determine a new list of discovered PCIe devices discovered thereby and compare 608 the new list of discovered PCIe devices to the expected list of PCIe devices in the configuration file. Next, the CPU is caused to determine 610 whether the offline PCIe device is discovered after the reset control signal from the programmable logic device. If the previously offline PCIe device is now on the discovered list of PCIe devices, the CPU operations end for this iteration. If the offline PCIe device is not present in the new list of discovered PCIe devices, the CPU again determines 612 if the number of device reset commands that has been sent for the offline PCIe device during a given period of time is equal to or less than the predefined threshold. If the number of device reset commands has reached the predefined threshold, then the CPU is further caused to determine whether an operator (e.g., a safety driver) is onboard the ADV 618. If the operator or safety driver is onboard the ADV (e.g., detected by a weight sensor at a driver's seat), the CPU is further caused to report 622 a restart failure of the offline PCIe device to a human machine interface (HMI) of the ADS so that the offline PCIe device can be reviewed for failure or restarted manually by the operator.

In one embodiment, if an operator or safety driver is not onboard the ADV, the CPU is further caused to report 620 a restart failure of the offline PCIe device to a remote computer (e.g., cloud server 103 shown in FIG. 1) in communication with the ADV for remote restart (e.g., remote interrupt) of the PCIe device.

Figure 6B:
FIG. 6B illustrates an example configuration file and discovered PCIe device list, according to one embodiment.

FIG. 6B illustrates an example configuration file 630 and example discovered PCIe device list 640. As illustrated, the configuration file 640 includes PCIe devices expected on ports 0, 1, 2 . . . , N. As indicated by the discovered PCIe device list 640, the discovered PCIe devices were found on ports 0, 1, and 5. No PCIe devices were discovered on Port 2. As detailed herein, the CPU would compare the discovered list 640 list to the expected list in the configuration file and send a device reset command to the programmable logic device (e.g., a CPLD) to reset the PCIe device on port 2.

Figure 7:
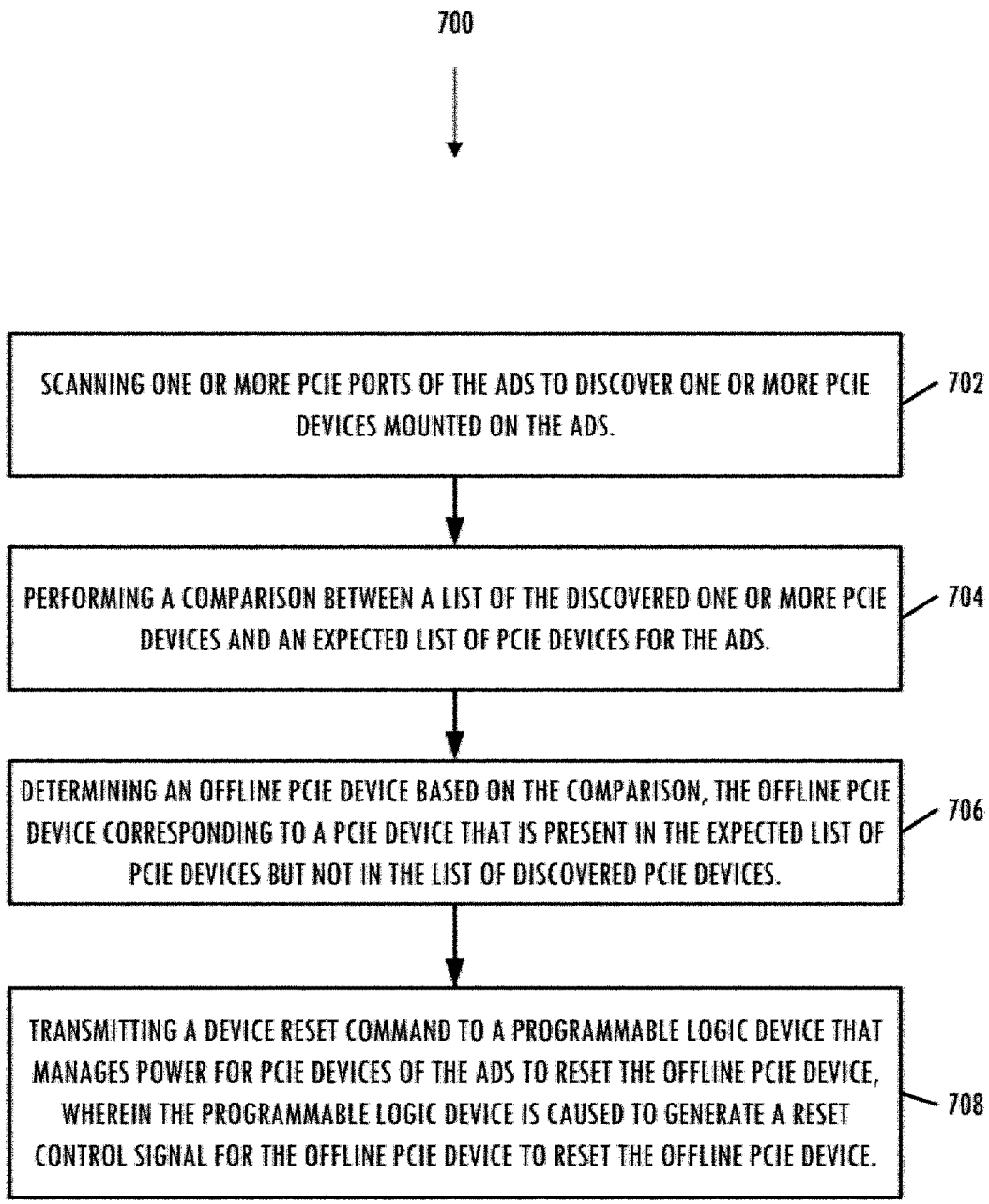
FIG. 7 is an example flow diagram of a method for controlling PCIe devices on an ADS, according to one embodiment.

FIG. 7 illustrates a flow chart of an example computer-implemented method 700 for controlling PCIe devices on an ADS of an ADV. Process 700 may be performed by processing logic which may include software, hardware, or a combination thereof. For example, process 700 may be performed by PCIe reset module 308 of FIG. 3A. In block 702, the method 700 includes scanning one or more PCIe ports of the ADS to discover one or more PCIe devices mounted on the ADS. In block 704, the method includes performing a comparison between a list of the discovered one or more PCIe devices and an expected list of PCIe devices for the ADS. In block 706, the method includes determining an offline PCIe device based on the comparison, the offline PCIe device corresponding to a PCIe device that is present in the expected list of PCIe devices but not in the list of discovered PCIe devices. In block 708, the method includes transmitting a device reset command to a programmable logic device that manages power for PCIe devices of the ADS to reset the offline PCIe device, wherein the programmable logic device is caused to generate a reset control signal for the offline PCIe device to reset the offline PCIe device.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for controlling peripheral component interconnect express (PCIe) devices on an autonomous driving system (ADS) of an autonomous driving vehicle (ADV), the method comprising:
    scanning one or more PCIe ports of the ADS to discover one or more PCIe devices mounted on the ADS;
    performing a comparison between a list of the discovered one or more PCIe devices and an expected list of PCIe devices for the ADS;
    determining an offline PCIe device based on the comparison, the offline PCIe device corresponding to a PCIe device that is present in the expected list of PCIe devices but not in the list of the discovered PCIe devices; and
    transmitting a device reset command to a programmable logic device that manages power for PCIe devices of the ADS to reset the offline PCIe device.

2. The method of claim 1, wherein the programmable logic device is configured to generate and send a reset control signal for the offline PCIe device to reset the offline PCIe device.

3. The method of claim 2, further comprising:
    scanning to discover the one or more PCIe devices again after the reset control signal is sent by the programmable logic device;
    determining a new list of discovered PCIe devices;
    comparing the new list of discovered PCIe devices to the expected list of PCIe devices; and determining whether the offline PCIe device is discovered after the reset control signal from the programmable logic device.

4. The method of claim 3, further comprising, in response to the offline PCIe device not being present in the new list of discovered PCIe devices, determining if a number of device reset commands that has been sent for the offline PCIe device during a given period of time is equal to or less than a predefined threshold.

5. The method of claim 4, further comprising, if the number of device reset commands is less than the predefined threshold, transmitting the device reset command to the programmable logic device again to reset the offline PCIe device.

6. The method of claim 5, further comprising, if the number of device reset commands is equal to the predefined threshold, determining whether an operator is onboard the ADV.

7. The method of claim 6, further comprising, in response to an operator being onboard the ADV, reporting a restart failure of the offline PCIe device to a human machine interface (HMI) of the ADS, such that the offline PCIe device can be reviewed for failure or restarted manually by the operator.

8. The method of claim 6, further comprising, in response to an operator not being onboard the ADV, reporting a restart failure of the offline PCIe device to a remote computer in communication with the ADV for remote restart of the offline PCIe device.

9. The method of claim 1, wherein the one or more PCIe devices comprise one or more of: a graphics processing unit (GPU), a solid state drive (SSD), a network interface card (NIC), a video capture card, a serial advanced technology attachment (SATA) card, or non-volatile memory express (NVMe) card.

10. A non-transitory machine-readable medium for controlling peripheral component interconnect express (PCIe) devices on an autonomous driving system (ADS) of an autonomous driving vehicle (ADV), the machine-readable medium having instructions stored therein, which when executed by a processor, cause the processor to perform operations, the operations comprising:
scanning one or more PCIe ports of the ADS to discover one or more PCIe devices mounted on the ADS;
performing a comparison between a list of the discovered one or more PCIe devices and an expected list of PCIe devices for the ADS;
determining an offline PCIe device based on the comparison, the offline PCIe device corresponding to a PCIe device that is present in the expected list of PCIe devices but not in the list of discovered PCIe devices; and
transmitting a device reset command to a programmable logic device that manages power for PCIe devices of the ADS to reset the offline PCIe device.

11. The non-transitory machine-readable medium of claim 10, wherein the programmable logic device is caused to generate and send a reset control signal for the offline PCIe device to reset the offline PCIe device.

12. The non-transitory machine-readable medium of claim 11, wherein the operations further comprise:
scanning to discover the one or more PCIe devices again after the reset control signal is sent by the programmable logic device;
determining a new list of discovered PCIe devices discovered by the processor;
comparing the new list of discovered PCIe devices to the expected list of PCIe devices; and
determining whether the offline PCIe device is discovered after the reset control signal from the programmable logic device.

13. The non-transitory machine-readable medium of claim 12, wherein in response to the offline PCIe device not being present in the new list of the discovered PCIe devices, the operations further comprise determining if a number of device reset commands that has been sent for the offline PCIe device during a given period of time is equal to or less than a predefined threshold.

14. The non-transitory machine-readable medium of claim 13, wherein if the number of device reset commands is less than the predefined threshold, the operations further comprise transmitting the device reset command to the programmable logic device again to reset the offline PCIe device.

15. The non-transitory machine-readable medium of claim 14, wherein if the number of device reset commands is equal to the predefined threshold, the operations further comprise determining whether an operator is onboard the ADV.

16. The non-transitory machine-readable medium of claim 15, wherein in response to an operator being onboard the ADV, the operations further comprise reporting a restart failure of the offline PCIe device to a human machine interface (HMI) of the ADS so that the offline PCIe device can be reviewed for failure or restarted manually by the operator.

17. The non-transitory machine-readable medium of claim 15, wherein in response to an operator not being onboard the ADV, the operations further comprise reporting a restart failure of the offline PCIe device to a remote computer in communication with the ADV for remote restart of the offline PCIe device.

18. The non-transitory machine-readable medium of claim 10, wherein the one or more PCIe devices comprise one or more of: a graphics processing unit (GPU), a solid state drive (SSD), a network interface card (NIC), a video capture card, a serial advanced technology attachment (SATA) card, or non-volatile memory express (NVMe) card.

19. A system for controlling peripheral component interconnect express (PCIe) devices on an autonomous driving system (ADS) of an autonomous driving vehicle (ADV), the system comprising:
one or more processors; and
a memory coupled to the one or more processors to store instructions, which when executed by the one or more processors, cause the one or more processors to:
scan one or more PCIe ports of the ADS to discover one or more PCIe devices mounted on the ADS;
perform a comparison between a list of the discovered one or more PCIe devices and an expected list of PCIe devices for the ADS;
determine an offline PCIe device based on the comparison, the offline PCIe device corresponding to a PCIe device that is present in the expected list of PCIe devices but not in the list of the discovered PCIe devices; and
transmit a device reset command to a programmable logic device that manages power for PCIe devices of the ADS to reset the offline PCIe device.

20. The system of claim 19, wherein the programmable logic device is configured to generate a reset control signal for the offline PCIe device to reset the offline PCIe device.

* * * * *